UNITED STATES PATENT OFFICE.

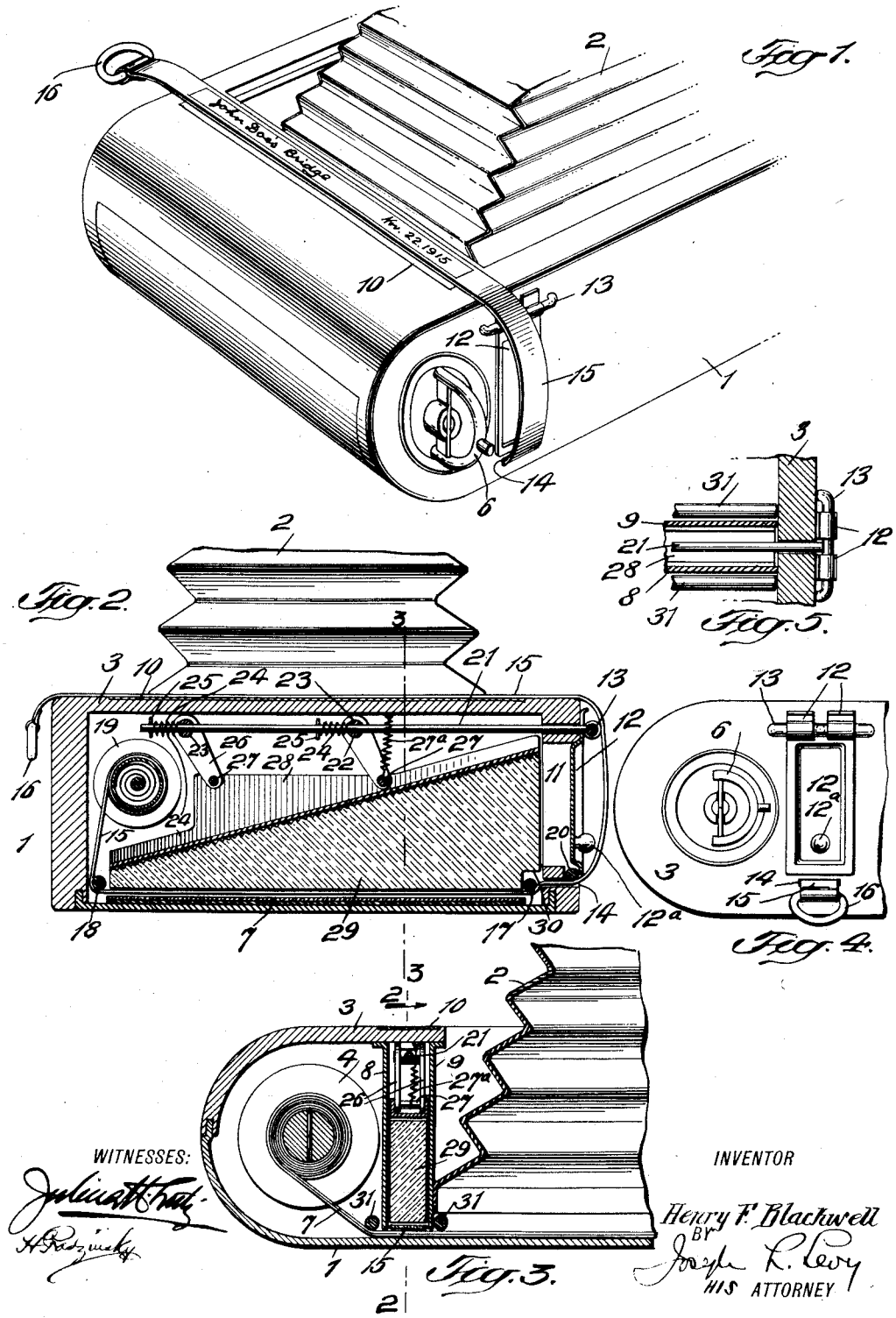

HENRY FIELD BLACKWELL, OF NEW YORK, N. Y., ASSIGNOR OF ONE-HALF TO MAX ERNEST JUTTE AND ONE-HALF TO MAUDE A. BLACKWELL, OF NEW YORK, N. Y.

PHOTOGRAPHIC INSCRIPTION-CAMERA.

1,256,769.  Specification of Letters Patent.  Patented Feb. 19, 1918.

Application filed January 14, 1916.  Serial No. 72,026.

*To all whom it may concern:*

Be it known that I, HENRY F. BLACKWELL, a citizen of the United States, and a resident of the city, county, and State of New York, have invented a new and useful Improvement in Photographic Inscription-Cameras, of which the following is a specification.

The object of my invention is to provide a camera of this class which may be used with a lead pencil or similar marking device for causing an autographic, photographic marking on the margin of the negative, by means of which the negative may be identified, as to time, place and circumstance, according to the volition of the person using the camera, or if desired, the camera may be used without such marking device. This and other objects are accomplished by my invention, some embodiments of which are hereinafter more particularly set forth.

For a more particular description of my invention, reference is to be had to the accompanying drawings forming part hereof, in which—

Figure 1 is a perspective view of a film camera provided with my improvement;

Fig. 2 is a sectional view taken on the line 2—2 of Fig. 3, looking in the direction of the arrow;

Fig. 3 is a sectional view taken on the line 3—3 of Fig. 2, looking in the direction of the arrow;

Fig. 4 is a side elevation of one end of a camera provided with my improvement;

Fig. 5 is a sectional view, taken near the top of Fig. 4.

Throughout the various views of the drawings, similar reference characters designate similar parts.

In the embodiment of my invention shown in Figs. 1 to 5, inclusive, a film camera 1 of any suitable construction is provided with the usual bellows 2, and the other incidental parts, some of which are not shown, such as the lens and shutter and diaphragm, all of which may be of the conventional form, or any other suitable form, and so is the casing 3 which carries a spool 4 mounted in the usual manner, and provided with a handle 6, by which the film 7 may be wound in the conventional way. Between the spool 4 and the bellows 2 is a well formed by the vertical walls 8 and 9 which are secured to the casing 3 immediately under a plate 10, of polished metal or other suitable substance, let into the casing 3 so as to be flush with the outer surface thereof. The well between the walls 8 and 9 receives light at one end through an opening 11 which is normally closed by a shutter 12 hinged at its upper end on a suitable pivot 13 with a movable hinge, so that when desired, the cover 12 may be opened and light admitted into the well; and, as will appear below, mechanism is provided so that as soon as the opening force is removed, the cover will automatically close and remain closed with a light-tight fit.

Immediately below the opening 11 is a second narrow opening or slot 14 through which passes a suitable translucent celluloid or similar tape 15, provided at one end with a ring 16, much the same as the corresponding ring of an ordinary tape measure and mounted the same way, and this tape is adapted to run over the plate 10, as shown in Figs. 1 and 2, and pass over the bar 20, guiding pins 17 and 18, see Fig. 3, the first being over the openings 14 and the two latter uniting the lower edges of the walls 8 and 9 and from the pin 18 the tape 15 runs to a spring roller 19 which is also mounted between the walls 8 and 9 and adapted to wind and unwind the same as the corresponding roll of an ordinary tape measure or a window shade, so that by the usual manipulation, the tape 15 may be wound or unwound, as desired. When wound, the ring 16 is as shown in Fig. 4, and when unwound, as shown in Fig. 2.

The shutter 12, which is hinged at its upper end on the pivot 13, is provided with ears which rest against the case 3 and so when this shutter is opened, the pivot is forced away from the case 3. This shutter 12 is also provided with a knob 12ª, projecting as shown, so as to be easily grasped, and the pivot 13 is connected to a horizontally disposed rod 21 which is slidably mounted in trunnions 22 and 23, and resiliently connected therewith by means of coil springs 24 held in place by stop pins 25. The trunnions 22 and 23 are mounted so as to turn in the parallel arms 26, the upper ends of which slide freely on the interior of the casing 3, and the lower ends of which are pivotally connected by suitable pins 27 to the prism follower 28. This follower has an inclined lower web with upturned edges, preferably as shown, and in these edges are placed the pivots 27. A spring 27ª connecting a bar 27 and case 3 tends to elevate this prism as shown. The lower and inclined surface of the follower 28 is secured to and presses against a prism 29 with a roughened upper surface, and a lower face that is true and carefully finished with a good polish, and the same is true of the end face adjacent to the opening 11. This prism 29 is preferably recessed at 30, so as to be free of the guide pin 17.

The connections between the shutter 12 and rod 21 are such that when the shutter is opened a small amount, the rod 21 is drawn outward in the direction of its length, and simultaneously with the opening of the shutter, the prism 29 is forced downwardly against the tape 15, and the tape is then forced against the film 7. Meanwhile light gets at the prism through the aperture 11 and is diffused by the rough upper surface so that diffused light is reflected through the bottom of the prism 29, and this diffused light, with a momentary exposure, causes the writing which is against the film and on the tape 15 to be properly reproduced on the negative, that is, a white line on a black ground and in reverse. When the negative is copied, the reverse appears, that is, a black line on a white ground, not reversed, so that the photograph indicates on its face just what it is. After the exposure is made, the shutter 12 is released and then the springs 24 restore it immediately to its initial position, and the arms 26 are again slanted so as to raise the follower 28 and then the prism 29 will also be raised, so that the tape 15 under the tension of the spring in the spring roll 19, will be clear of the film 7. To properly guide this film 7, suitable guide rods or guide pins 31 are placed close to the lower edges of the walls 8 and 9. The tape 15 may be cleaned after each use when the legend is removed.

While I have shown only one embodiment of my invention, it is obvious that it is not restricted thereto, but is broad enough to cover all structures which come within the scope of the annexed claims.

Having thus described my invention, what I claim is:—

1. In a device of the class described, a translucent means carrying a darker written legend, means for carrying a light sensitive medium adjacent to said translucent means, reflecting means including a prism for transmitting light to this legend, so that it will be copied on the sensitive means.

2. In a device of the class described, a translucent means on which a legend may be placed, means for carrying a light sensitive medium adapted to be made into a negative adjacent to said translucent means, a prism, a shutter and means connecting the prism and shutter for causing the prism to be pressed against said translucent medium when the shutter is opened.

3. In a device of the class described, translucent means on which a legend may be placed, means for carrying a light sensitive medium adjacent to said translucent means, a prism for transmitting light to said translucent means and to said light sensitive means through said translucent means, and means connecting said shutter and prism, whereby the opening of the shutter causes the prism to be pressed against said translucent means.

4. In a device of the class described, a translucent tape and a device on which said tape may be wound and from which it may be unwound, means for supporting said tape while a legend is being placed thereon, means for placing the part of the tape containing said legend adjacent to a film, and means for admitting light through said tape and to said film, whereby the legend on said tape may be reproduced on said film.

5. In a device of the class described, a casing having two parallel walls and a prism mounted between said walls, a shutter adjacent to said prism and means connecting said shutter and prism for forcing said prism toward said casing when the shutter is opened.

Signed at the town of Highland, county of Ulster and State of New York, this 12th day of January, 1916.

HENRY FIELD BLACKWELL.

Witnesses:
F. F. SIMPSON,
ALBERTA D. YOUNG.